United States Patent
Hsu

(10) Patent No.: US 9,155,105 B2
(45) Date of Patent: *Oct. 6, 2015

(54) ENHANCED ACCESS CONTROL IN LTE ADVANCED SYSTEMS

(71) Applicant: MEDIATEK INC., Hsinchu (TW)

(72) Inventor: Chia-Chun Hsu, Taipei (TW)

(73) Assignee: MEDIATEK INC. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,330

(22) Filed: Dec. 29, 2014

(65) Prior Publication Data

US 2015/0111520 A1   Apr. 23, 2015

Related U.S. Application Data

(63) Continuation of application No. 13/585,810, filed on Aug. 14, 2012, now Pat. No. 8,938,233.

(60) Provisional application No. 61/524,118, filed on Aug. 16, 2011.

(51) Int. Cl.
*H04W 4/00* (2009.01)
*H04W 72/00* (2009.01)
(Continued)

(52) U.S. Cl.
CPC .............. *H04W 74/002* (2013.01); *H04W 4/22* (2013.01); *H04W 8/02* (2013.01); *H04W 48/02* (2013.01); *H04W 4/005* (2013.01); *H04W 48/10* (2013.01)

(58) Field of Classification Search
CPC ...... H04W 48/08; H04W 48/10; H04W 48/12
USPC ............... 455/404.1, 432.1, 450, 451, 452.1, 455/452.2, 453
See application file for complete search history.

(56) References Cited

U.S. PATENT DOCUMENTS

| | | | |
|---|---|---|---|
| 8,259,567 B2 | 9/2012 | Kanauchi et al. | 370/230 |
| 2010/0273496 A1 | 10/2010 | Obata et al. | 455/450 |

(Continued)

FOREIGN PATENT DOCUMENTS

| | | |
|---|---|---|
| CN | 102045810 A | 10/2009 |
| CN | 101969635 A | 4/2010 |

(Continued)

OTHER PUBLICATIONS

USPTO, Office Action for the parent U.S. Appl. No. 13/585,810 dated Dec. 17, 2013.

(Continued)

*Primary Examiner* — Christopher M Brandt
(74) *Attorney, Agent, or Firm* — Imperium Patent Works; Zheng Jin; Helen Mao

(57) ABSTRACT

An enhanced access control method is proposed for machine-type communications (MTC) in a 3GPP LTE-Advanced network. An MTC device is configured for enhanced access barring (EAB). When the MTC device attempts access to the network, the NAS layer checks whether EAB is applicable for the MTC device. If yes, then the NAS layer forwards EAB configuration to the AS layer for further EAB control. Based on the EAB configuration, a base station broadcasts EAB information to UEs via system information block. The EAB information indicates whether barring is applied to a number of EAB categories and a number of access classes. Based on the EAB information, the MTC devices performs EAB for access attempt to RRC. If access is not barred under EAB, then the MTC device further performs ACB for access attempt to RRC.

20 Claims, 4 Drawing Sheets

(51) Int. Cl.
*H04M 11/04* (2006.01)
*H04W 74/00* (2009.01)
*H04W 48/02* (2009.01)
*H04W 4/22* (2009.01)
*H04W 8/02* (2009.01)
*H04W 48/10* (2009.01)

(56) References Cited

U.S. PATENT DOCUMENTS

| | | | |
|---|---|---|---|
| 2011/0058480 A1 | 3/2011 | Dahlén | 370/237 |
| 2011/0199898 A1 | 8/2011 | Cho et al. | 370/230 |
| 2012/0039171 A1 | 2/2012 | Yamada et al. | 370/232 |
| 2012/0076085 A1 | 3/2012 | Chou | 370/329 |
| 2012/0281531 A1 | 11/2012 | Susitaival | 370/230 |
| 2013/0035064 A1 | 2/2013 | Balachandran et al. | 455/411 |
| 2013/0039309 A1 | 2/2013 | Chiu | 370/329 |
| 2013/0040597 A1 | 2/2013 | Jang et al. | 455/404.1 |
| 2013/0040605 A1 | 2/2013 | Zhang et al. | 455/411 |
| 2014/0128029 A1* | 5/2014 | Fong et al. | 455/411 |

FOREIGN PATENT DOCUMENTS

| | | |
|---|---|---|
| EP | 1435749 A1 | 12/2002 |
| EP | 2525607 A1 | 11/2012 |
| WO | WO2011087041 A1 | 7/2011 |

OTHER PUBLICATIONS

USPTO, Office Action for the parent U.S. Appl. No. 13/585,810 dated May. 5, 2014.
International Search Report and Written Opinion of International Search Authority for PCT/CN2012/080211 dated Nov. 29, 2012 (11 pages).
3GPP TS 22.011 V11.0.0, Jun. 30, 2011, $3^{rd}$ Generation Partnership Project, Technical Specification Group Services and Systems Aspects, Service Accessibility (Release 11), p. 15 Chapter 4.1 to p. 17 chapter 4.3, p. 18 chapter 4.3.4.
3GPP TSG-RAN WG2#74, R2-113339, LG Electronics Inc. Further Discussion on EAB, Barcelona Spain, May 9-13, 2011, p. 1 to p. 3.
JPO Office Action summary for JP patent application 2014-521933 (1 page).
R2-113217 3GPP TSG RAN WG2 Meeting #74; Intel Corporation; EAB for RAN Overload Protection; Barcelona, Spain dated May 9-13, 2011 (4 pages).
R2-113261 3GPP TSG RAN WG2 $74; Samsung; Overview of Solutions on MTC; Barcelona, Spain dated May 9-13, 2011 (3 pages).
R2-112951 3GPP TSG-Ran WG2 Meeting #74; Huawei, HiSilicon; Further Consideration on EAB; Barcelona, Spain dated May 9-13, 2011 (2 pages).
R2-113030 3GPP TSG-RAN WG2 #74; Ericsson, ST-Ericsson; Extended Access Barring for MTC Devices; Barcelona, Spain dated May 9-13, 2011 (3 pages).
R2-114012 3GPP TSG-RAN WG2 #75; Vodafone; Applicability of EAB in a Shared Network Environment; Athens, Greece dated Aug. 22-28, 2011 (3 pages).
R2-113886 3GPP TSG-RAN WG2 Meeting #75; InterDigital; Network Sharing Considerations for EAB Implementation; Athens, Greece dated Aug. 22-26, 2011 (6 pages).
R2-105609 3GPP TSG RAN WG2 Meeting #71bis; Intel Corporation; MTC Indication in RRC Signaling for Overload Prevention; Xi'an, China dated Oct. 11-15, 2010 (5 pages).
EPO, Office Action for the EP patent application 12823733.6 dated May 13, 2015 (9 pages).
GP-110355 3GPP TSG-GERAN Meeting #49; Realizing Extended Access Barring; Telefon AB LM Ericsson et al.; Chengdu, China dated Feb. 28-Mar. 4, 2011 (16 pages).
3GPP TS 22.011 V11.0.0, Jun. 30, 2011, $3^{rd}$ Generation Partnership Project, Technical Specification Group Services and Systems Aspects, Service Accessibility (Release 11).
3GPP TSG-RAN WG2#74, R2-113339, LG Electronics Inc. Further Discussion on EAB, Barcelona Spain, May 9-13, 2011 (5 pages).

* cited by examiner

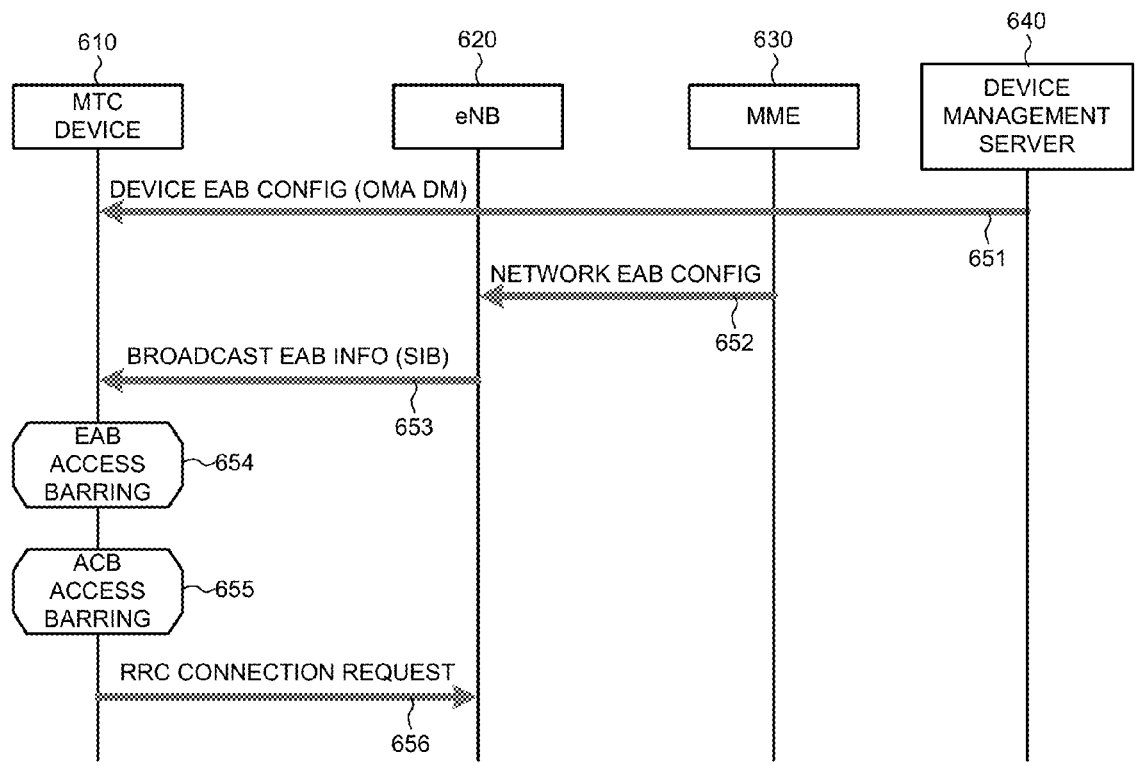

ENHANCED ACCESS CONTROL IN LTE ADVANCED SYSTEMS

CROSS REFERENCE TO RELATED APPLICATIONS

This application is a continuation, and claims priority under 35 U.S.C. §120 from nonprovisional U.S. patent application Ser. No. 13/585,810, entitled "Enhanced Access Control in LTE Advanced Systems," filed on Aug. 14, 2012, the subject matter of which is incorporated herein by reference. Application Ser. No. 13/585,810, in turn, claims priority under 35 U.S.C. §119 from U.S. Provisional Application No. 61/524,118, entitled "Enhanced Access Control Method for OFDMA System Communications", filed on Aug. 16, 2011; the subject matter of which is incorporated herein by reference.

TECHNICAL FIELD

The disclosed embodiments relate generally to Machine type communications, and, more particularly, to enhanced access control for machine type communications in LTE-Advanced systems.

BACKGROUND

Machine type communication is a form of data communication that involves one or more entities that do not necessarily need human interaction. A service optimized for machine type communication differs from a service optimized for human-to-human (H2H) communication. Typically, machine type communication services are different to current mobile network communication services as it involves different market scenarios, pure data communication, lower cost and effort, and a potentially very large number of communicating terminals with little traffic per terminal.

The terms Machine-to-Machine (M2M) and Machine-Type Communications (MTC) are used to describe use cases and illustrate the diverse characteristics of machine type communication service. M2M and MTC devices will be part of the next generation wireless networks to enable "internet of things". Potential M2M and MTC applications include security, tracking and tracing, payment, health, remote maintenance/control, metering, and consumer devices. The main characteristics of machine type communication services include low mobility, time controlled, delay tolerant, packet-switched only, small data transmissions, mobile originated only, infrequent mobile terminated, MTC monitoring, priority alarm, secure connection, location specific trigger, network provided destination for uplink data, infrequency transmission, and group based MTC features.

The end-to-end application between an MTC device and an MTC server or between two MTC devices is provided by 3GPP LTE systems. A 3GPP LTE system provides transport and communication services optimized for MTC. MTC traffic, however, may not be controlled by the network/core network. For example, an MTC application may request many MTC devices to do "something" at the same time, resulting in a large number of M2M devices trying to access the wireless service during a very short amount of time. As a result, many MTC devices may send a large number of random access channel (RACH) preambles and thereby causing high RACH collision probability. In addition, when a core network entity goes down, there is no mechanism to postpone the MTC devices from continuous access attempts. Consequently, many MTC devices are roamers and may all move to local competing networks when their own serving network fails, which may potentially cause traffic overload in the not (yet) failed network(s).

FIG. 1 (Prior Art) illustrates a radio network congestion use case in an LTE network 100. LTE network 100 comprises a MTC server 110, a packet data network gateway (PDN GW) 120, a serving GW 130, two base stations eNB 141 and eNB 142, and a plurality of M2M devices. Radio network congestion occurs when massive concurrent data transmission takes place in some MTC applications, as illustrated in FIG. 1. One of the typical applications is bridge monitoring with a mass of sensors. When a train passes through the bridge, all the MTC sensors transmit monitoring data almost simultaneously. The same thing happens in hydrology monitoring during the time of heavy rain, and in building monitoring when intruders break in. Therefore, it is desirable that the network is optimized to enable a mass of MTC devices in a particular area to transmit data almost simultaneously.

FIG. 2 (Prior Art) illustrates a core network congestion use case in an LTE network 200. LTE network 200 comprises a MTC server 210, a packet data network gateway (PDN GW) 220, a serving GW 230, two base stations eNB 241 and eNB 242, and a plurality of M2M devices. For many MTC applications, a large number of MTC devices are affiliated with a single MTC user (e.g., MTC user 250). These MTC devices together are part of a MTC group (e.g., MTC group 260). For example, MTC user 250 is associated with MTC group 260, and MTC user 250 owns MTC server 210. The MTC devices in MTC group 260 communicate with MTC server 210. Typically, the MTC devices in the same MTC group are scattered over the network in such a way that the data simultaneously sent by the MTC devices in any particular cell is limited and will not cause a radio network overload. However, when a high number of MTC devices are sending/receiving data simultaneously, data congestion may occur in the mobile core network or on the link between the mobile core network and the MTC server where the data traffic related to the MTC group is aggregated, as illustrated in FIG. 2. Therefore, it is desirable that a network operator and the MTC user have means to enforce a maximum rate for the data sent/received by the same MTC group.

Access Class Barring (ACB) is a mechanism to limit the number of simultaneous access attempts from certain MTC devices. All UEs (e.g., MTC devices) are member of one out of ten randomly allocated mobile populations, defined as access class 0 to 9. The population number is stored in UE's SIM/USIM. In addition, the UEs may be members of one or more out of five special categories (e.g., Access Class 11 to 15), also stored in the SIM/USIM. Under the ACB mechanism, the network operator may prevent certain UEs from making access attempts or responding to pages in specific areas of a PLMN based on the corresponding access class. In addition to the ACB mechanism, other enhanced access control solutions are sought for optimized MTC services.

SUMMARY

An enhanced access control method is proposed for machine-type communications (MTC) in a 3GPP LTE-Advanced network. An MTC device is configured for enhanced access barring (EAB). When the MTC device attempts access to the network, the NAS layer checks whether EAB is applicable for the MTC device. If yes, then the NAS layer forwards EAB configuration to the AS layer for further EAB control. Based on the EAB configuration, a base station broadcasts EAB information to UEs via system information block. The EAB information indicates whether barring is applied to a number of EAB categories and a number of access classes. Based on the EAB information, the MTC devices performs EAB for access attempt to RRC. If access is not barred under EAB, then the MTC device further performs ACB for access attempt to RRC. By combining EAB mechanism with ACB mechanism, additional flexibility of access control is achieved.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 illustrates one example of EAB information broadcasted via a system information block (SIB).

FIG. 6 illustrates a method of providing enhanced access barring in accordance with one novel aspect.

DETAILED DESCRIPTION

Reference will now be made in detail to some embodiments of the invention, examples of which are illustrated in the accompanying drawings.

Figure 1:
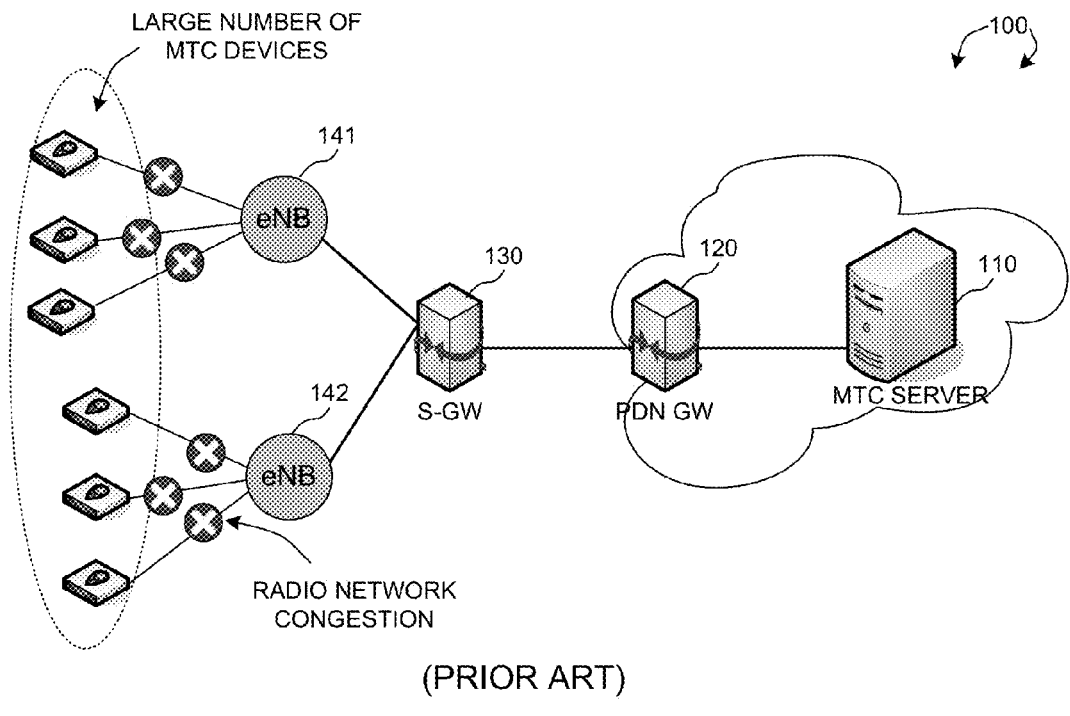
FIG. 1 (Prior Art) illustrates a radio network congestion use case in a 3GPP LTE network.
Figure 2:
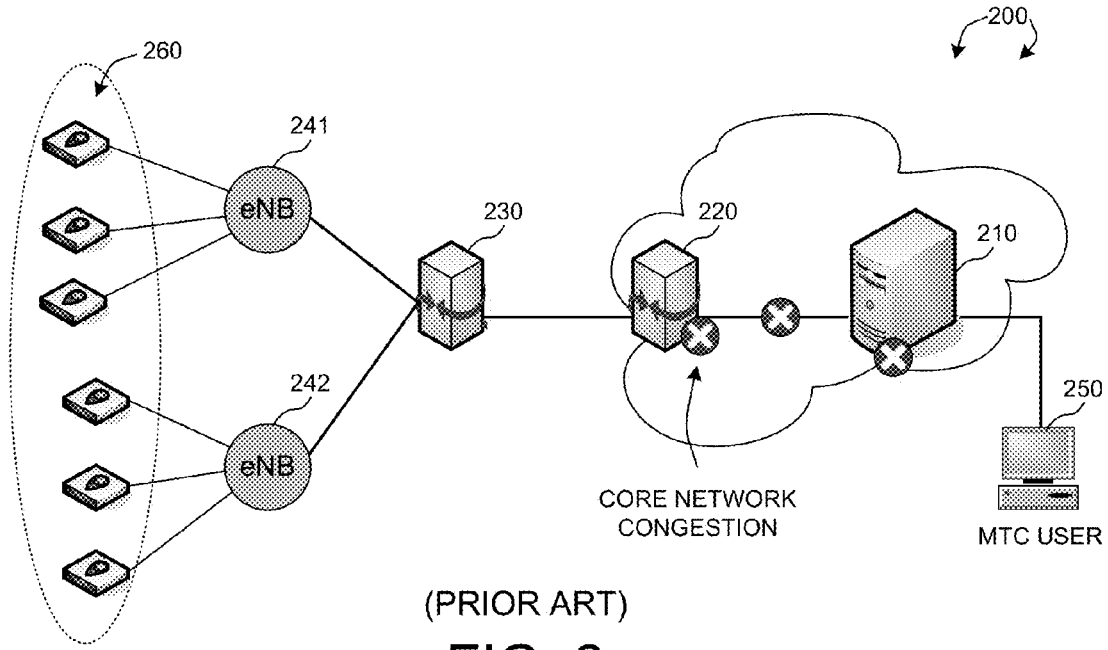
FIG. 2 (Prior Art) illustrates a core network congestion use case in a 3GPP LTE network.
Figure 3:
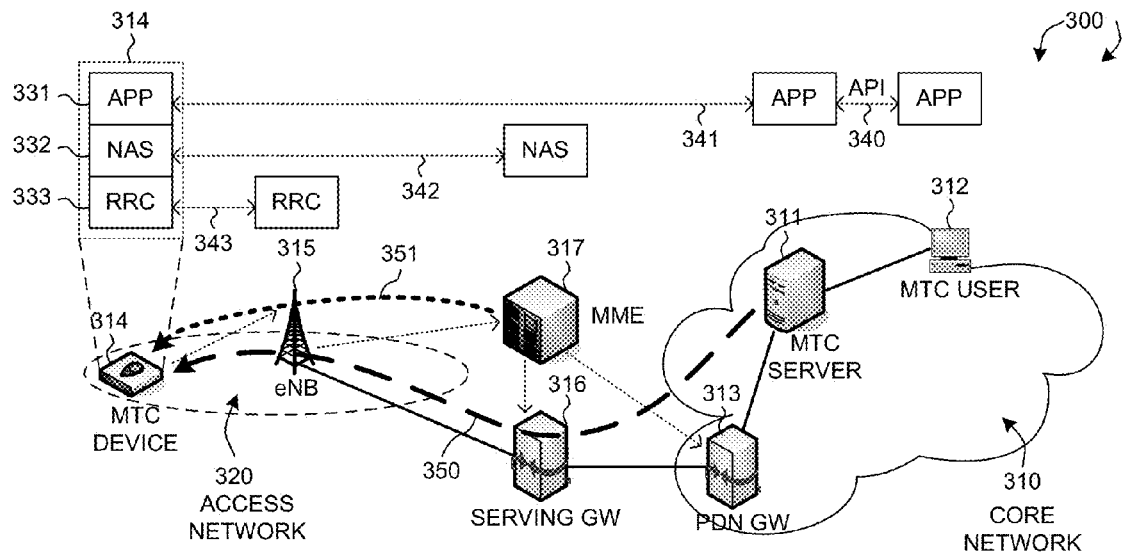
FIG. 3 illustrates a 3GPP LTE network that supports Machine-Type Communication (MTC) in accordance with one novel aspect.

FIG. 3 illustrates a 3GPP LTE network 300 that supports Machine-Type Communications (MTC) in accordance with one novel aspect. 3GPP LTE network 300 comprises an MTC server 311 that provides various MTC services to an MTC user 312 by communicating with a plurality of MTC devices (e.g., MTC device 314 as illustrated in FIG. 3). In the example of FIG. 3, MTC server 311, MTC user 312, and a packet data network gateway (PDN GW) 313 belong to part of a core network 310. MTC device 314 and its serving base station (eNB) 315 belong to part of a radio access network (RAN) 320. MTC server 311 communicates with MTC device 314 through PDN GW 313, serving GW 316, and eNB 315. In addition, a mobility management entity (MME) 317 communicates with eNB 315, serving GW 316 and PDN GW 313 for mobility management of wireless access devices in 3GPP network 300. It is noted that, MTC device 314 is a type of user equipment (UE), and the term MTC is referred to as machine-to-machine (M2M) communication as compared to human-to-human (H2H) communication, while an MTC device is also referred to as an M2M device as compared to H2H device.

In the example of FIG. 3, MTC server 311 provides various MTC services/applications to MTC user 312 in application (APP) protocol layer through an established application-programming interface (API) 340. Typical MTC applications include security (e.g., surveillance system), tracking and tracing (e.g., pay as you drive), payment (e.g., vending and gaming machines), health (e.g., health persuasion system), remote maintenance/control, metering (e.g., smart grid), and consumer devices (e.g., eBooks). To provide the end-to-end MTC services, MTC server 311 communicates with the plurality of MTC devices in the 3GPP network. Each MTC device (e.g. MTC device 314) comprises various protocol layer modules to support the end-to-end MTC applications and data connections. In the application level, APP module 331 communicates with MTC server 311 in APP protocol layer (e.g., depicted by dashed line 341), which provides the end-to-end control/data. In the network or NAS level, NAS module 332 communicates with MME 317 in non-access stratum protocol layer (e.g., depicted by dashed line 342), which supports mobility management and other signaling functionality. In the radio network access (RAN) or AS level, RRC module 333 communicates with eNB 315 in radio resource control (RRC) protocol layer (e.g., depicted by dashed line 343), which takes care of broadcast of system information, RRC connection control, paging, radio configuration control, QoS control, etc.

Because the MTC server is not necessarily located inside the network operator domain, and because end-to-end MTC services may not necessarily involve the MTC server, MTC traffic is most likely not controlled by the network/core network. As a result, if a large number of MTC devices (e.g., much larger than the designed dimension, in terms of the number of UEs of a cell, or an eNB, or an MME) want to access wireless service during a short amount of time, a large number of random access channel (RACH) preambles sent from the MTC devices to their serving base station would likely to cause high RACH collision probability. Allocating extra RACH resource (slot or preambles), although may reduce collision probability, may lead to inefficient radio resource usage. Furthermore, when a core network went down, many MTC devices are roamers and all move to local competing networks when their own serving network fails, which would potentially overload the not (yet) failed network(s).

In one novel aspect, an enhanced access barring (EAB) mechanism is provided for the network operator to control access attempts from UEs that are configured for EAB in order to prevent overload of the access network and/or the core network. In congestion situations, the network operator can restrict access from UEs configured for EAB while permitting access from other UEs. Typically, UEs configured for EAB are considered more tolerant to access restrictions than other UEs. When the network operator determines that it is appropriated to apply EAB, the network broadcasts EAB information to provide EAB control for UEs in a specific area.

For example, upon an access attempt by MTC device 314, in NAS layer, MTC device 314 first checks whether EAB is configured and applicable for MTC device 314. If EAB is not configured or EAB is not applicable, then no further EAB control in AS layer (e.g., in RAN 320) is needed. If the NAS layer decided that EAB is configured and applicable for MTC 314, then further EAB check is needed in AS layer of MTC device 314. The AS layer EAB check is based on EAB information broadcasted from eNB 315. In AS layer, eNB 315 determines the EAB information based on EAB configuration transmitted from MME 315. The EAB information is then broadcasted to MTC device 314 via system information block. Upon acquiring the EAB information, MTC device 314 attempts RRC access subject to EAB control. Note that, if the network does not broadcasting the EAB information to UE, UE is still subject to access class barring (ACB) if ACB information is broadcasted. In addition, after the EAB check, if a UE is not barred based on the EAB information, then the UE is still subject to ACB if ACB information is broadcasted.

Figure 4:
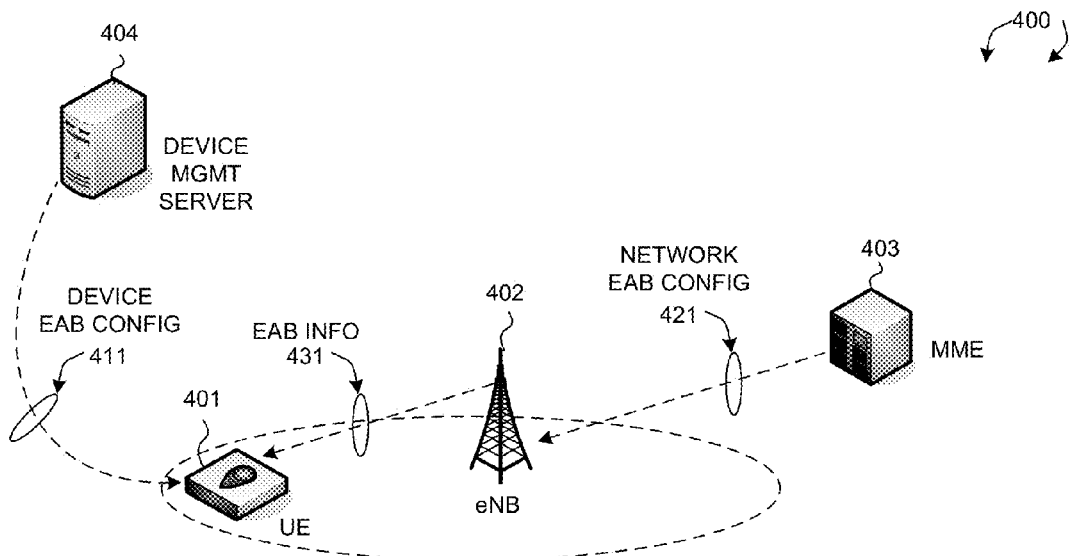
FIG. 4 illustrates an enhanced access barring (EAB) mechanism in accordance with one novel aspect.

FIG. 4 illustrates one embodiment of EAB mechanism in 3GPP LTE network 400. 3GPP LTE network 400 comprises a user equipment UE 401, a base station eNB 402, a mobility management entity MME 403, and a device management server 404. To facilitate the EAB mechanism, each UE device is configured for whether the device is subject to EAB control in its home public land mobile network (HPLMN). The device EAB configuration is based on device type (e.g., low priority MTC devices, devices are more tolerant to access restriction than normal UEs), based on UE behavior (e.g., bad behavior such as keep accessing a downed server), based on UEs having certain APN (e.g., certain applications are more tolerant to access restriction than other applications), or based on UEs in specific area (e.g., UEs in congested area). The device EAB configuration is signaled through an OTA protocol such as Open Mobile Alliance (OMA) Device Management (DM) protocol. In the example of FIG. 4, device management server 404 sends the device EAB configuration 411 to UE 401. For example, if UE 401 is an MTC device, then it is configured subject to EAB control. Once the device EAB configuration is received by UE 401, it could be permanent and only be modified or removed by explicit signaling. In this invention, it is denoted that a MTC device shall apply EAB when it is configured by device management sever 404, the device EAB configuration can be a bit to force the MTC device to apply EAB in NAS/AS layer.

When the network operator determines that it is appropriated to apply EAB due to the congestion, MME 403 will send network EAB configuration 421 to the AS layer (e.g., eNB 402) for EAB control. The additional network EAB configuration mainly includes the following information: 1) what percentage of traffic from MTC traffic (e.g., 10%, 20%, 30%, . . . , 100%) need to be barred, which is matched to how many access classes (AC) to be barred, 2) EAB categories to be barred, and 3) specific area for applying EAB. First, all UEs are members of one out of ten randomly allocated mobile populations, defined as access classes 0 to 9. The population number is stored in UE's SIM/USIM. In addition, UEs may be members of one or more out of five special categories (e.g., Access Classes 11 to 15), also stored in the SIM/USIM. The percentage of traffic needs to be barred is then mapped to how many access classes to be barred. For example, if 50% of MTC traffic needs to be barred, then UEs having access class 0-4 may be barred accordingly.

Second, each UE belongs to one of three specific EAB categories (a), (b), and (c) with respect to its roaming status. EAB category (a) is defined for normal UEs that are configured for EAB; EAB category (b) is defined for UEs that are configured for EAB, and are neither in their HPLMN nor in a PLMN that is equivalent to HPLMN (e.g., roaming UE); and EAB category (c) is defined for UEs that are configured for EAB, and are neither in the PLMN listed as most preferred PLMN of the country where the UE is roaming in the operator-defined PLMN selector list on the SIM/USIM, nor in their HPLMN nor in a PLMN that is equivalent to HPLMN. When EAB mechanism is applied, one or more EAB categories may be barred.

Third, MME 403 may determine a specific area that EAB mechanism is applied. For example, if radio network congestion occurs in an area with regard to a number of concerned eNBs, then MME 403 sends the network EAB configuration only to those concerned eNBs. Other eNBs outside of the radio network congestion will not receive the network EAB configuration and thus will not perform any further EAB control. This way, EAB control is only applied in a limited number of relevant cells for more efficient access control.

Upon receiving the network EAB configuration 421, eNB 402 broadcasts EAB information 431 to UE 401, e.g., through system information block (SIB). The broadcasted EAB information 431 defines whether EAB applies to UEs having one of the three EAB categories. EAB information also includes extended barring information for access classes 0-9. Based on the EAB information, the AS network checks the UE EAB category and access class to determine whether access is barred. In the case of multiple core networks sharing the same access network (RAN sharing), the access network shall be able to apply EAB for the core networks individually. The concerned PLMN is included with EAB configuration.

FIG. 5 illustrates one example of EAB information broadcasted via a system information block (SIB). Table 500 illustrates one example of system information block type 14 (e.g., SIB14). In SIB14, the EAB configuration parameters include common configuration and per-PLMN configuration. For each PLMN, the EAB configuration parameters include 1) enumerated EAB category 501, indicating which EAB categories to be barred, and 2) bitmap of barring access classes 502, indicating which access classes to be barred. The EAB information may also includes PLMN ID and associated barring parameters including barring factor and barring time. Because the EAB information is broadcasted to the UEs, each UE only needs to acquire EAB information in RRC_IDLE mode. In addition, only UEs that are configured for EAB will read the EAB information from SIB14. Normal UEs not configured for EAB do not need to acquire SIB14.

FIG. 6 illustrates a method of providing enhanced access barring in mobile network 600 in accordance with one novel aspect. Mobile network 600 comprises an MTC device 610, an eNB 620, an MME 630, and a device management server 640. Initially, in step 651, MTC device 610 is configured for EAB by device management server 640. Later on, the network operator determines to apply EAB mechanism upon network congestion when MTC device 610 attempts to access the mobile network. In step 652, MME 630 checks EAB applicability of concerned eNB and sends network EAB configuration to eNB 620 if EAB is applicable. The EAB applicability for each MTC device depends on several factors. First, the MTC device has been configured for EAB (e.g., in step 651). Second, the attempted access is not an emergency call, or the MTC device does not belong to one of the special access classes (11-15). Third, the attempt access is delay tolerant (e.g., based on establishment cause of the access attempt).

In step 653, upon receiving the EAB configuration from MME 630, eNB 620 determines EAB information for the current cell and broadcasts the EAB information to MTC device 610 via SIB. To save power, MTC device 610 does not need to read the EAB information periodically. Instead, MTC device 610 receives an indication from eNB 620, e.g., the indication is a pre-defined tag on paging channel, and MTC device 610 in response reads the EAB information in the SIB. In addition, when EAB information changes, the value tag in SIB1 does not need to be changed. This way, normal UEs not subject to EAB do not need to re-acquire the SIB due to EAB information change.

Upon acquiring the EAB information, in step 654, MTC device 610 performs EAB access barring based on its EAB category and access class. If access is barred, MTC device 610 stops attempting to access the radio network. If access is not barred, MTC device 610 performs ACB (if MTC device 610 is configured for ACB and ACB information is broadcasted by eNB 620) in step 655. MTC device 610 can only attempt to access the radio network (e.g., start RACH procedure) after successfully passing both EAB and ACB. In step 656, MTC device 610 sends a RRC connection request to eNB 620. Additional flexibility of access control to the radio network can be achieved by applying both EAB and ACB for the same UEs.

If MTC device 610 is barred from accessing the radio network, then MTC device 610 may have more opportunities to access the radio network later, either via timer mechanism, or via changed EAB configuration. There are different ways to implementing access barring. In one embodiment, access barring is achieved via barring parameters including access probability (e.g., barring factor) and retry timer (e.g., barring time) performed at the UE side. In another embodiment, access barring is achieved via changed EAB information determined at the eNB side. For example, if 50% of MTC traffic is barred, then eNB 620 determines that access classes 0-4 are barred initially. Later on, eNB 620 determines that access classes 5-9 are barred such that each access class has similar access distribution. The updated EAB information is indicated to UE 610 by a pre-defined tag on paging channel.

Figure 7:
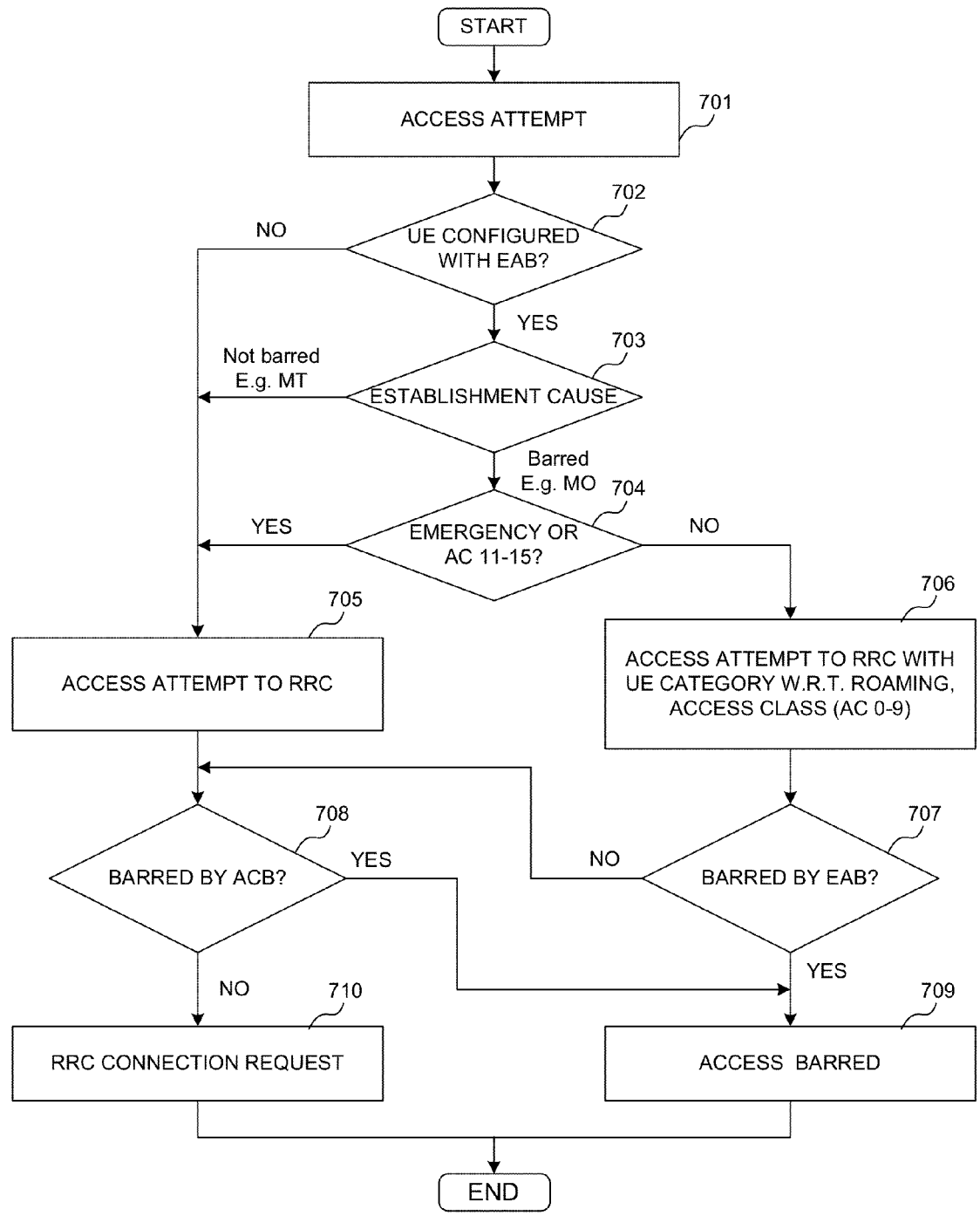
FIG. 7 is a flow chart of a method of enhanced access barring for optimized machine-type communication in accordance with one novel aspect.

FIG. 7 is a flow chart of a method of enhanced access barring for optimized machine-type communication in accordance with one novel aspect. In step 701, a user equipment (UE) attempts to access a mobile network. Based on the type of device and the type of access, the NAS layer checks whether EAB is applicable for the UE. In step 702, the NAS layer checks whether the UE is configured with EAB (e.g., an MTC device type is configured with EAB). If no, then the UE performs access attempt to establish an RRC connection (step 705). If yes, then the NAS layer further checks if the access is for low priority access (e.g., Establishment Cause=delay tolerant access), or the access is a Mobile Originated (MO) session (e.g., Establishment cause=MO-signaling or MO data) (step 703). This is because MO session is typically delay-tolerant, as compared to Mobile Terminated (MT) session. If the answer is yes in step 703, then the UE performs access attempt to establish an RRC connection (step 705). If no, then the NAS layer further checks if the access is an emergency call, or the UE belongs to one of the special access classes 11-15 (step 704). The special access classes are allocated to specific high priority users as follows: class 15 for PLMN staff, class 14 for Emergency services, class 13 for Public Utilities, class 12 for Security Services, and class 11 for PLMN use. If the answer is yes in step 704, then the UE is not subject to EAB and performs access attempt to establish an RRC connection (step 705). If no, then the UE performs access attempt for RRC connection under the EAB mechanism (step 706).

Under the EAB mechanism, the AS layer further checks whether the UE is barred for access to RRC based on EAB information broadcasted from the serving base station. The EAB information contains the EAB category with respect to roaming and a list of access classes. In step 707, the UE checks whether its EAB category and access class is barred based on the EAB information. If the answer is yes, then access is barred for the UE for this access attempt. Otherwise, the UE checks whether access is barred under normal ACB mechanism (step 708).

Access Class Barring (ACB) is a mechanism to limit the number of simultaneous access attempts from certain UEs. As compared to H2H Access Class (AC), M2M Access Class (AC) may apply different access probability, barring parameters, and retry timer parameters. Such procedure may be implemented in application level, NAS level, or RAN level (e.g., RACH access level) access distribution. In application level access distribution, barring is done by prioritize access based on type of services. For example, different access probability is based on QoS requirement and/or delay-tolerant level of different applications. In NAS level access distribution, barring is done by access restriction, e.g., prioritize access based on service type, MTC server, and device ID (e.g. new MTC ID, international mobile equipment identity (IMEI), international mobile subscriber identity (IMSI), etc.). In RAN level access distribution, barring is done by applying different ac-BarringFactor in Access Class Barring mechanism. For example, different barring factors and retry timers are applied for MTC devices. By combining EAB mechanism with ACB mechanism, additional flexibility of access control is achieved.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   detecting a device enhanced access barring (EAB) configuration by a user equipment (UE) in a mobile communication network, wherein the UE EAB configuration indicates whether the UE is configured with EAB such that the UE is subject to restriction of any EAB category;
   acquiring EAB information from a base station by the UE if the UE is configured with EAB, wherein the EAB information indicates whether barring is applied to a number of EAB categories and a number of access classes broadcasted via a system information block;
   performing enhanced access barring by the UE for radio resource control (RRC) connection based on the EAB information; and
   performing access class barring (ACB) for RRC connection if the UE is configured for ACB and is not barred by the enhanced access barring.

2. The method of claim 1, wherein an EAB category is associated with a roaming status of the UE in a public land mobile network (PLMN).

3. The method of claim 1, wherein the UE stores a population number in a Subscriber Identity Module or Universal Subscriber Identity Module (SIM/USIM), and wherein the population number is mapped to a corresponding access class.

4. The method of claim 1, wherein the UE is configured for EAB by an Open Mobile Alliance (OMA) Device Management (DM) server.

5. The method of claim 1, wherein the EAB information further comprises a public land mobile network (PLMN) ID and associated barring parameters including a barring factor and a barring time.

6. The method of claim 1, further comprising:
   determining whether EAB is applicable to the UE, wherein the UE is applicable for EAB only if the UE is configured for EAB.

7. The method of claim 6, wherein the UE is not applicable for EAB if the UE belongs to one of a special access classes 11-15 or if the access attempt belongs to an emergency call.

8. The method of claim 6, wherein the UE is applicable for EAB if an establishment cause indicates a mobile originated (MO) signaling or MO data.

9. The method of claim 6, wherein the UE is applicable for EAB if an establishment cause indicates a delay tolerant access.

10. A method comprising:
    detecting a device enhanced access barring (EAB) configuration by a user equipment (UE) in a mobile communication network, wherein the device EAB configuration indicates whether the UE is subject to EAB;

acquiring EAB information from a base station by the UE if the UE is subject to EAB, wherein the EAB information indicates whether barring is applied to a number of EAB categories and a number of access classes broadcasted via a system information block (SIB), and wherein the UE checks schedule information in SIB1 to decide if the EAB information in SIB14 is available;

performing enhanced access barring by the UE for radio resource control (RRC) connection based on the EAB information; and performing access class barring (ACB) for RRC connection if the UE is configured for ACB and is not barred by the enhanced access barring.

11. The method of claim 10, wherein the UE reacquires SIB1 and SIB14 for updated EAB information, and wherein the UE performs enhanced access barring for RRC connection using the updated EAB information.

12. The method of claim 10, wherein an EAB category is associated with a roaming status of the UE in a public land mobile network (PLMN).

13. The method of claim 10, wherein the UE stores a population number in a Subscriber Identity Module or Universal Subscriber Identity Module (SIM/USIM), and wherein the population number is mapped to a corresponding access class.

14. The method of claim 10, wherein the UE is configured for EAB by an Open Mobile Alliance (OMA) Device Management (DM) server.

15. The method of claim 10, wherein the EAB information further comprises a public land mobile network (PLMN) ID and associated barring parameters including a barring factor and a barring time.

16. The method of claim 10, further comprising:

determining whether EAB is applicable to the UE, wherein the UE is applicable for EAB only if the UE is configured for EAB.

17. A method, comprising:

determining, by a mobility management entity (MME), whether enhanced access barring (EAB) is applicable to a base station serving a plurality of user equipments (UEs) in a mobile communication network;

determining EAB configuration by the MME if EAB is applicable, wherein the EAB configuration indicates a percentage of traffic to be barred for EAB and an EAB category to be barred; and forwarding the EAB configuration to the base station if EAB is applicable.

18. The method of claim 17, wherein each EAB category is associated with a roaming status of a UE in a public land mobile network (PLMN).

19. The method of claim 17, wherein EAB is applicable if a UE served by the base station is configured for EAB, and if the UE does not have a special access class, and if access attempts by the UE is non-emergent and are delay-tolerant.

20. The method of claim 17, further comprising:

selecting one or more base stations based on a congestion condition, wherein the congestion condition only concerns the one or more base stations associated with a specific area; and forwarding the EAB configuration to the selected base stations.

* * * * *